United States Patent [19]

Sternberger

[11] Patent Number: 4,967,791
[45] Date of Patent: Nov. 6, 1990

[54] PRESSURE ACTIVATED CHECK VALVE

[75] Inventor: Joe E. Sternberger, Wichita, Kans.

[73] Assignee: The Boeing Company, Seattle, Wash.

[21] Appl. No.: 343,291

[22] Filed: Apr. 26, 1989

[51] Int. Cl.⁵ ............................................. F16K 15/18
[52] U.S. Cl. .................................. 137/522; 251/63.4; 251/82
[58] Field of Search ............... 137/522, 523; 251/63.4, 251/82

[56] References Cited

U.S. PATENT DOCUMENTS

| | | | |
|---|---|---|---|
| 1,623,431 | 4/1927 | McVoy | 251/63.4 |
| 2,322,517 | 6/1943 | Hose | 251/63.4 X |
| 2,476,378 | 7/1949 | Majneri | 251/63.4 |
| 2,778,378 | 1/1957 | Presnell | 137/522 X |
| 3,317,181 | 5/1967 | Robbins, Jr. | 251/63.4 X |
| 3,435,844 | 4/1969 | Stelzer | 137/522 |
| 3,631,887 | 1/1972 | Schlechtriem et al. | 137/522 |
| 3,916,946 | 11/1975 | Matzer | 137/522 X |
| 3,981,479 | 9/1976 | Foster et al. | 137/522 X |
| 4,172,469 | 10/1979 | Boehringer | 137/512.3 |
| 4,562,862 | 1/1986 | Mucheyer et al. | 137/522 |
| 4,624,445 | 11/1986 | Putnam | 137/522 X |
| 4,738,282 | 4/1988 | Boeringer | 251/63.4 X |

FOREIGN PATENT DOCUMENTS

| | | | |
|---|---|---|---|
| 0012170 | 1/1982 | Japan | 137/523 |
| 1151801 | 5/1969 | United Kingdom | 137/523 |

Primary Examiner—John Rivell
Attorney, Agent, or Firm—Finnegan, Henderson, Farabow, Garrett & Dunner

[57] ABSTRACT

A pressure activated check valve comprising a valve body defining an axial fluid flow passage between inlet and outlet ports, a poppet valve assembly disposed in the passage for movement between an open position permitting two-way fluid flow through the passage and a closed position obstructing fluid flow through the passage, a spring for normally biasing the poppet valve assembly to the open position, a fluid pressure port adapted for fluid communication with a selectively pressured fluid source for selectively moving the poppet valve assembly to the closed position in opposition to the spring and elements responsive to fluid pressure in the inlet port for permitting fluid flow from the inlet port to the outlet port when the poppet valve assembly is in the closed position.

9 Claims, 4 Drawing Sheets

PRESSURE ACTIVATED CHECK VALVE

BACKGROUND OF THE INVENTION

1. Field of the Invention

The invention relates to a pressure activated check valve and more particularly to a check valve that allows fluid flow in two directions when hydraulic pressure is turned off, and in only one direction when pressure is turned on.

2. Description of The Related Art

Conventional poppet type check valves include a poppet valve and a poppet spring housed within a valve body. The poppet spring exerts a force on the poppet valve in a first direction to seat the poppet valve and prevent fluid from flowing in the first direction. Fluid flowing into the valve in a second direction opposite the first direction exerts pressure on the poppet valve overcoming the force of the poppet spring and allowing fluid flow through the valve body.

Check valves, such as the one described above, are useful in airplane hydraulic systems for allowing hydraulic fluid to flow from hydraulic actuators into a return line while at the same time preventing hydraulic fluid from flowing in the opposite direction.

A typical application of a check valve used in aircraft hydraulic systems is on the return port of a solenoid operated control valve, such as the control valve for a weapons bay door actuator. The check valve allows fluid from the actuator to flow into the return line, but prevents fluid in the return line from flowing back into the actuator when the control valve is turned off. This is primarily a safety feature preventing for example, an actuator leak from draining fluid from an entire hydraulic system. A solenoid control valve, when turned off, closes off the pressure line but allows return line fluid to flow in either direction. This provides pressure relief on the actuator and associated plumbing due to thermal expansion of the hydraulic fluid.

In various actuation systems for an apparatus, it is necessary to operate the apparatus, such as actuators for weapons bay doors, while the the hydraulic system is off. In a typical actuation system for bay doors, the actuators are arranged so that a slightly larger volume of fluid is required to open the door than is required to close the door. With this arrangement, the directional check valve as described would not allow the actuator to draw fluid, thus the actuator would be prevented from fully extending without drawing a vacuum.

Installing a previously developed manually operated check valve would solve this problem, but would require complicated cable runs and pulleys to link the manual check valve to a manual release handle.

The present invention comprises a check valve that is activated to the checked mode by pressure from the airplane hydraulic system. When the airplane hydraulic system is turned off, the check valve assumes an unchecked position allowing fluid to flow through the valve in either direction.

U.S. Pat. No. 4,738,282 discloses a zero leakage valve that assumes a checked position when a hydraulic system is turned off and assumes an unchecked position when a hydraulic system is turned on. This type of valve fails to overcome the problems in the prior art since it is necessary to have a valve that remains in an unchecked position when the hydraulic system is turned off.

It is an object of the present invention to provide a pressure activated check valve that remains in a checked position when an airplane's hydraulic system is turned on, and remains in an unchecked position when an airplane's hydraulic system is turned off.

A further object of the invention is to provide a check valve which may be deactivated without the need for complicated cable runs and pulleys linking the check valve to a manual release handle.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

SUMMARY OF THE INVENTION

To achieve the foregoing objects, and in accordance with purposes of the invention as embodied and broadly described herein, there is provided a pressure activated check valve comprising a valve body defining an axial fluid flow passage between inlet and outlet ports, a poppet value assembly disposed in the passage for movement between an open position permitting two-way fluid flow through the passage and a closed position obstructing fluid flow through the passage, means for normally biasing the poppet valve assembly to the open position, fluid pressure means for selectively moving the poppet valve assembly to the closed position in opposition to the biasing means, and means responsive to fluid pressure in the inlet port for permitting fluid flow from the inlet port to the outlet port when the poppet valve assembly is in the closed position. The invention also includes a hydraulic system having a hydraulic actuator manually manipulatable when the hydraulic pressure is turned off, the hydraulic system comprising a pressure line and a return line connected to the actuator, a pressure activated check valve disposed between the return line and the actuator, the check valve obstructing fluid flow from the return line to the actuator when the hydraulic pressure is turned on, and allowing fluid flow from the return line to the actuator when the hydraulic pressure is turned off.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DESCRIPTION OF THE PREFERRED EMBODIMENT

Reference will now be made in detail to the present preferred embodiment of the invention as illustrated in the accompanying drawings.

Figure 2:
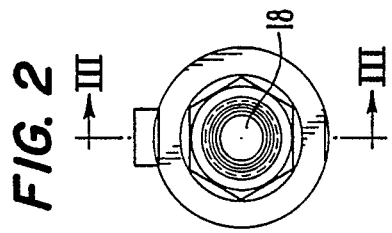
FIG. 2 is an end view of the check valve illustrated in FIG. 1.
Figure 1:
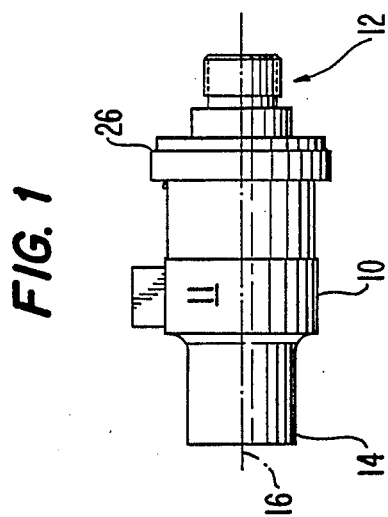
FIG. 1 is a side view of a check valve incorporating the teachings of the present invention.
Figure 3:
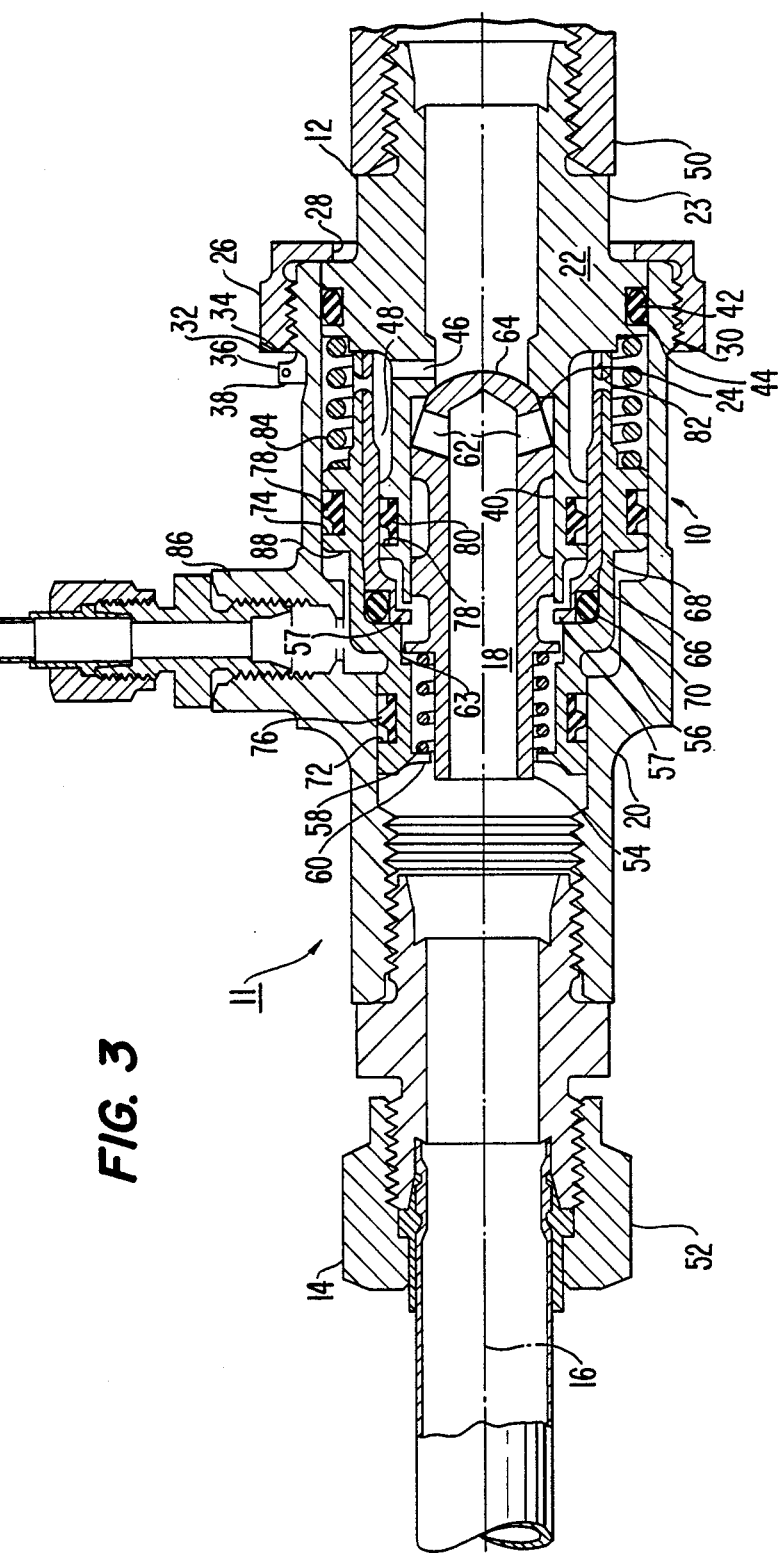
FIG. 3 is a cross-sectional view taken along line III—III of FIG. 2.

In accordance with the present invention there is provided a pressure activated check valve comprising a valve body defining an axial fluid flow passage between inlet and outlet ports. As shown in FIGS. 1 and 3, check valve 11 includes valve body 10 having inlet port 12 at one end and outlet port 14 at the other end. Elongated central axis 16 extends through fluid flow passage 18 at the core of valve body 10. Hydraulic line fittings 50 and 52 are provided in inlet port 12 and outlet port 14, respectively. Valve body 10 includes external element 20 and internal element 22. Internal element 22 fits into external element 20 at the inlet end 12 and includes tubular valve guide 40 axially extending into the center of flow passage 18. Valve guide 40 includes annular valve seat surface 24 located proximate the inlet end 12. Circular cap 26 having circular opening 28 screw onto threaded portion 30 of external element 20 to hold internal element 22 within external element 20. Protruding end 23 of internal element 22 extends through circular opening 28 of cap 26. External element 20 is provided with a small safety ear 36 having circular bore 38 located proximate to threaded portion 30. A safety wire (not shown) extends through circular bore 38 and elongated hole 34 provided in the edge 32 of cap 26. The safety wire prevents cap 26 from being inadvertently unscrewed from external element 20. 0-ring 42 is provided in circular ridge 44 of internal element 22 proximate to cap 26 to provide a leak-proof seal between internal element 22 and external element 20. Internal element 22 also includes vent bore 46 that extends from flow passage 18 into space 48 between valve guide 40 and external element 20. Vent bore 46 serves to vent space 48 to prevent a vacuum from forming in that area.

In accordance with the present invention, the check valve comprises a poppet valve assembly disposed in said passage for movement between an open position permitting two-way fluid flow through said passage, and a closed position obstructing fluid flow through said passage. As embodied herein, the poppet valve assembly includes poppet valve 54 movably disposed within two-piece piston 56. Two-piece piston 56 and poppet valve 54 are both movable along central axis 16 within flow passage 18. Poppet spring 58 is interposed between spring stop 60 of piston 56 and bias ridge 63 of poppet valve 54. Poppet spring 58 serves to urge poppet valve 54 in the direction of inlet port 12.

Figure 4:
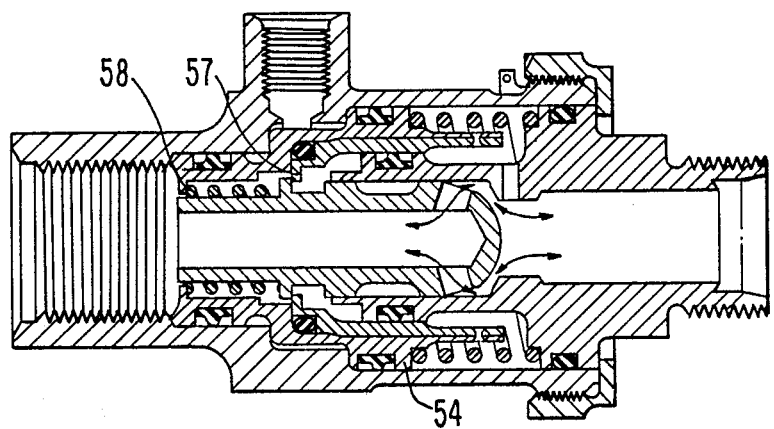
FIG. 4 is a cross-sectional view taken along line III—III of FIG. 2 illustrating fluid flow with the valve assembly in an opened position.

In the open position depicted in FIG. 4, piston 54 is moved in a direction away from inlet port 12. In the open position fluid can freely flow through passage 18 in either direction via openings 62 in poppet valve 54. Piston 56 includes stop 57 to prevent poppet spring 58 from moving poppet head 64 into a contact position with annular valve seat surface 24.

Figure 5:
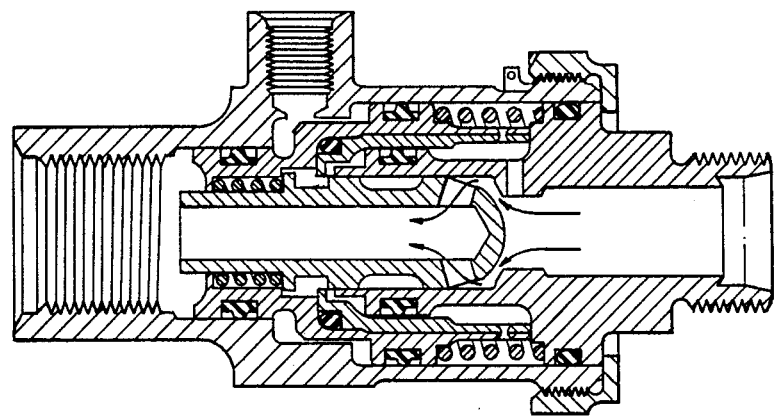
FIG. 5 is a cross-sectional view taken along line III—III of FIG. 2 illustrating fluid flow through the valve when the valve assembly is in a checked position.

In the closed position depicted in FIG. 5, piston 54 is moved towards inlet port 12. In the closed position, poppet head 64 is seated against annular valve seat surface 24 to form a flow obstructing seal preventing fluid flow from outlet port 14 towards inlet port 12. However, fluid flowing from inlet port 12 towards outlet port 14 exerts pressure on poppet head 64 to overcome the force of poppet spring 58 and allow uni-directional flow through the valve. (uni-directional flow represented by arrows in FIG. 5). Poppet spring 58 is designed to allow poppet valve 54 to open in response to typical return pressure in inlet port 12.

Two-piece piston 56 is comprised of internal piston element 66 and external piston element 68. Elements 66 and 68 are connected proximate to inlet port 12 by a plurality of rivets 82. O-ring 70 is disposed between elements 66 and 68 to form a leak-proof seal. In addition, external piston element 68 includes two annular ridges 72 and 74. Two T-rings 76 and 78 are disposed in ridges 72 and 74 respectively to form a leak-proof seal between piston 56 and external body element 20. Valve guide 40 also includes annular ridge 78 and T-ring 80 for forming a leak-proof sea between valve guide 40 and internal element 66 of piston 56.

Also in accordance with the present invention, the check valve comprises means for normally biasing said poppet valve assembly to the open position. As embodied herein, biasing means comprises piston spring 84 interposed between valve body internal element 22 and piston 56. As depicted in FIG. 4, the force of piston spring 84 urges piston 56 to an open position allowing fluid to flow through the valve in both directions.

In accordance with the present invention, the check valve comprises fluid pressure means for selectively moving said poppet valve assembly to said closed position in opposition to said biasing means. As embodied herein, fluid pressure means comprises pressure port 86 and piston pressure surface 88. Pressure port 86 provides flow communication between pressure line 90 and piston pressure surface 88. When the airplane hydraulic system is on, pressure from pressure line 90 exerts a force on piston pressure surface 88 to overcome the force of piston spring 84. This causes the valve assembly to move to the closed position as depicted in FIG. 5.

Also, in accordance with the present invention, the check valve includes means responsive to fluid pressure in said inlet port for permitting fluid flow from said inlet port to said outlet port when said poppet valve assembly is in said closed position. As embodied herein, and as described earlier, means responsive to fluid pressure in said inlet port includes valve spring 58 and poppet head 64. As depicted in FIG. 5, when the valve assembly is in the closed position, pressure in inlet port 12 exerts a force on poppet head 64 to overcome the force of valve spring 58 and allow fluid to flow from inlet port 12 to outlet port 14.

Figure 6:
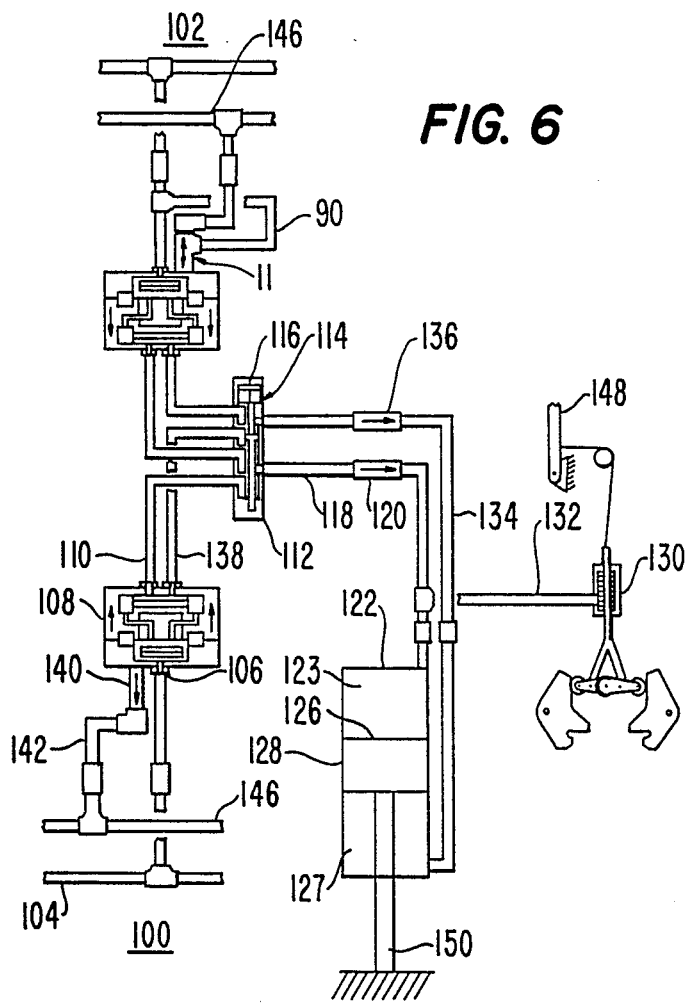
FIG. 6 is a depiction of an airplane hydraulic system incorporating the check valve of the present invention.

Use of the check valve will now be described in connection with the hydraulic weapons bay door system depicted in FIG. 6. Hydraulic fluid from pressure line 104 of primary system 100 enters conventional 4-way 2 position solenoid valve 108 through port 106. When solenoid valve 108 is in the off position, fluid from pressure line 104 is prevented from entering solenoid valve 108. When solenoid valve 108 is turned on, fluid passes through valve 108 and into line 110. Line 110 is connected to conventional dual shuttle valve 112. Fluid under pressure entering shuttle valve 112 causes valve member 114 to move against the force of shuttle spring 116 and allows fluid to flow through the valve into line 118. Line 118 is connected to conventional door actuator 112 and pressure activated door latch 130 through conventional directional flow control valve 120. Directional control valve 120 allows fluid flow in both directions but limits the rate of flow entering actuator 122 to prevent excessive actuator rate of travel. Fluid in line 118 flows into line 132 and door latch 130 to release door latch 130. Fluid entering upper chamber 123 of actuator 122 from line 118 exerts a downward pressure on the upper surface 126 of actuator piston 128 to open weapons bay doors (not shown). Hydraulic fluid returning from lower chamber 127 of actuator 122 flows through line 134, directional control valve 136, shuttle valve 112, line 138 and into solenoid valve 108. Solenoid valve 108 directs the fluid through conventional check valve 140 and into return line 146 via line 142. Check valve 140 prevents fluid from flowing from return line 146 towards actuator 122.

In the event that primary system 100 fails, shuttle valve member 114 under the bias of shuttle valve spring 116 remains in a position blocking line 110 and to allow pressure to enter actuator 122 from back-up system 102. Back-up system 102 is identical to primary system 100 except that conventional check valve 140 is replaced with pressure activated check valve 11. (depicted in detail in FIGS. 1–5) When the airplane is running, hydraulic pressure in valve line 90 activates check valve 11 causing it to function in the same manner as conventional check valve 140. However, when the airplane is shut down and no pressure exists in valve line 90, check valve 11 permits flow in either direction.

It is sometimes necessary to open weapons bay doors when the airplane is shut down. In this situation, shuttle valve member 114 blocks line 110 obstructing fluid communication between primary system 100 and actuator 122, and allowing fluid communication between back-up system 102 and actuator 122. A conventional check valve in back-up system 102 would prevent the doors from opening since it would not allow downwardly moving piston 126 to draw fluid from return line 146' into upper chamber 123 of actuator 122. If fluid is unable to enter chamber 123 of actuator 122, piston rod 150 would be unable to fully extend making it impossible to fully open the weapons bay doors.

Pressure activated check valve 11 allows actuator 122 to be manually manipulated when the airplane is shut down. All an operator need do is pull manual latch release handle 148 to release door latch 130. Once latch 130 is released, the door will partially open due to gravity, then the operator can manually pull on the weapons bay door to fully extend actuator rod 150. Since no pressure exists in valve line 90, check valve 11 remains in an unchecked position allowing fluid to be drawn from return line 146' into chamber 123 of actuator 122. Thus, the doors may be manually opened.

Additional advantages and modifications will readily occur to those skilled in the art. The invention in its broader aspects is, therefore, not limited to the specific details, representative apparatus and illustrative example shown and described. Accordingly, departures may be made from such details without departing from the spirit or scope of the general inventive concept as defined by the appended claims and their equivalents.

What is claimed is:

1. A pressure activated check valve comprising:
a valve body defining an axial fluid flow passage from an inlet port to an outlet port;
a poppet valve assembly disposed in said passage for axial movement between an open position permitting two-way fluid flow through said passage and a closed position obstructing fluid flow through said passage;
means for normally biasing said poppet valve assembly to the open position;
fluid pressure means for selectively moving said poppet valve assembly to said closed position in opposition to said biasing means; and
means responsive to fluid pressure in said inlet port for permitting fluid flow from said inlet port to said outlet port when said poppet valve assembly is in said closed position.

2. The check valve of claim 1 wherein said poppet valve assembly comprises an annular piston coaxially disposed in said passage for axial movement between said open and closed positions, a valve member coaxially disposed in said piston for limited axial movement relative to said piston between first and second positions, and an annular valve seat integral with said valve body and projecting into said passage for sealing engagement with said valve member in said first position when said piston is in said closed position.

3. A check valve of claim 1, wherein the biasing means includes a spring interposed between said valve body and said piston to move said piston towards said open position.

4. The check valve of claim 1, wherein the fluid pressure means includes a pressure port in said valve body adapted for fluid communication with a selectively pressurized fluid source, said pressure port being disposed to communicate fluid pressure to said poppet valve assembly in opposition to said biasing means to move said poppet valve assembly towards said closed position.

5. The check valve of claim 2, wherein said permitting means includes a spring interposed between said piston and said valve member biasing said valve member toward said first position, the force of said spring being insufficient to resist fluid pressure in said inlet port permitting such fluid pressure to move said valve member relative to said piston to said second position spaced from said valve seat when said piston is in said closed position.

6. A check valve as set forth in claim 2, wherein said piston includes an interior element and an exterior element, said elements being connected by rivots.

7. A pressure activated check valve comprising:
a valve body defining an axial fluid flow passage between inlet and outlet ports and including a valve seat projecting into said passage between said ports;
an annular piston coaxially disposed in said passage for axial movement between open and closed positions;
a valve member coaxially disposed in said piston for limited axial movement relative to said piston between first and second positions, said valve member in said first position sealingly engaging said valve seat to obstruct fluid flow through said passage when said piston is in said closed position;
means for normally biasing said piston toward said open position;
fluid pressure means for selectively moving said piston to said closed position in opposition to said biasing means; and
spring means interposed between said piston and said valve member for normally biasing said valve member axially toward said first position and for permitting said valve member in response to fluid pressure in said inlet port to move relative to said piston in said closed position to said second position spaced from said valve seat.

8. The check valve of claim 7, wherein said biasing means includes a spring interposed between said valve body and said piston biasing said piston toward said open position wherein said valve member in said first position is spaced from said valve seat.

9. The check valve of claim 7, wherein said fluid pressure means includes a pressure port in said valve body adapted for fluid communication with a selectively pressurized fluid source, said pressure port being disposed to communicate fluid pressure to said piston in opposition to said biasing means to bias said piston toward said closed position.

* * * * *